(12) United States Patent
Beaudoin

(10) Patent No.: US 7,316,413 B2
(45) Date of Patent: Jan. 8, 2008

(54) STEERING MECHANISM FOR WHEELBARROW

(75) Inventor: Michel Beaudoin, Bonsecours (CA)

(73) Assignee: Les Aciers Robond Inc., Magog, Quebec (CA)

( * ) Notice: Subject to any disclaimer, the term of this patent is extended or adjusted under 35 U.S.C. 154(b) by 253 days.

(21) Appl. No.: 11/259,263

(22) Filed: Oct. 27, 2005

(65) Prior Publication Data

US 2007/0096414 A1 May 3, 2007

(51) Int. Cl.
B62B 1/00 (2006.01)

(52) U.S. Cl. .................. 280/653; 280/47.26; 298/2

(58) Field of Classification Search ............... 280/653, 280/654, 655, 43.1, 43.14, 43.24, 47.26, 280/47.31, 47.33, 763.1, 764.1; 298/2, 3
See application file for complete search history.

(56) References Cited

U.S. PATENT DOCUMENTS 2,492,157 A 12/1949 Riviere
3,066,945 A 12/1962 Prescott
4,767,128 A * 8/1988 Terhune ................ 280/47.2
4,854,601 A * 8/1989 Herndon ............... 280/47.31
4,955,625 A * 9/1990 Herndon ............... 280/47.31
5,924,708 A 7/1999 Bisaillon et al.
6,446,989 B1 * 9/2002 Intengan ............... 280/47.34

* cited by examiner

Primary Examiner—Christopher P. Ellis
Assistant Examiner—Brian Swenson
(74) Attorney, Agent, or Firm—George A. Seaby

(57) ABSTRACT

A steerable wheelbarrow includes a pair of handles rotatably connected to the rear end of the frame of the wheelbarrow for rotation around a horizontal axis, and a pair of linkages connecting the handles to L-shaped, wheel carrying axles, which are interconnected by a separate linkage, whereby rotation of the handles in opposite directions around the horizontal axis results in rotation of the axles around parallel, vertical axes to turn the wheelbarrow. A stop mechanism limits turning of the wheels to decrease the likelihood of tipping during turning.

7 Claims, 5 Drawing Sheets

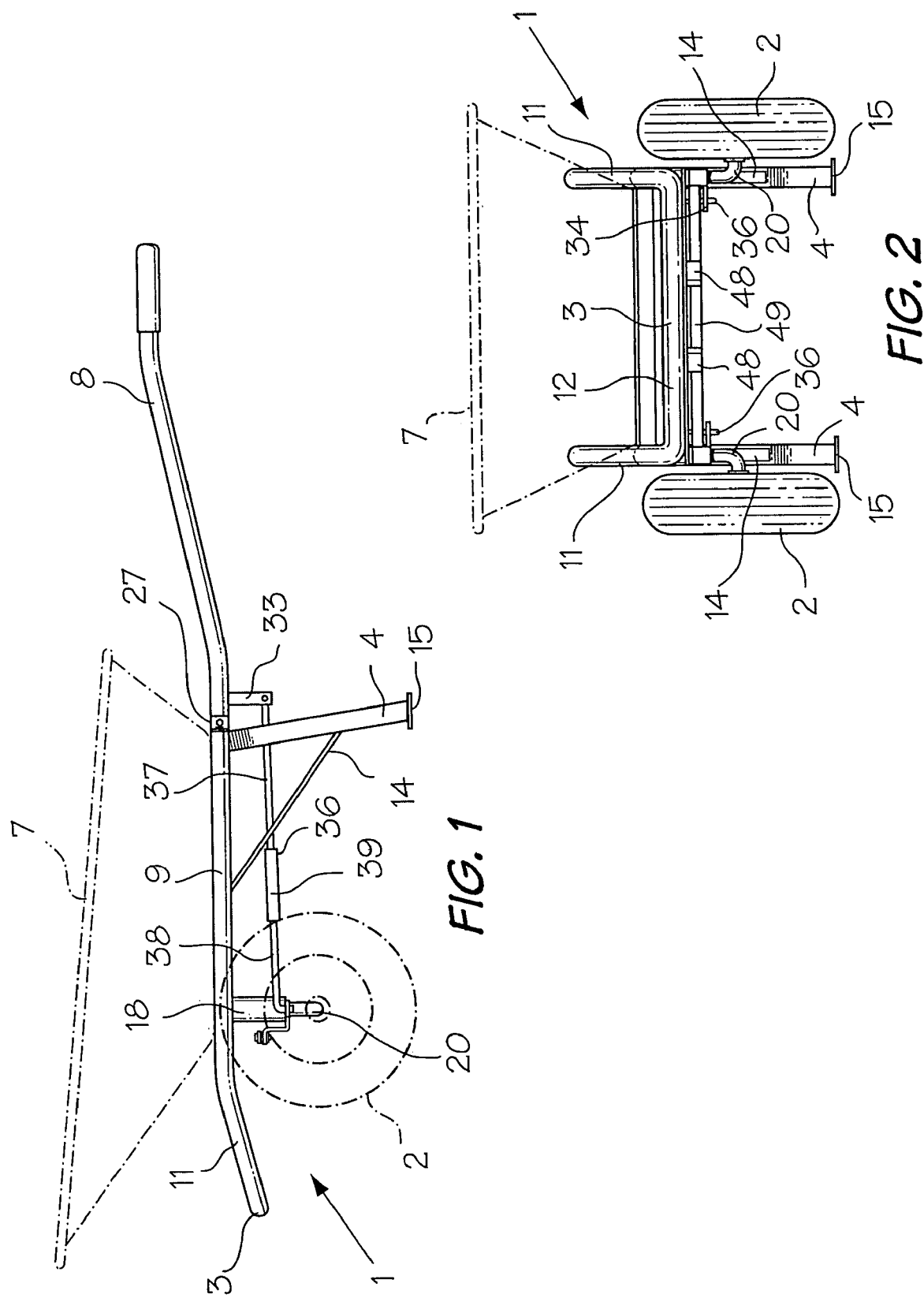

STEERING MECHANISM FOR WHEELBARROW

BACKGROUND OF THE INVENTION

1. Field of the Invention

This invention relates to a wheelbarrow and, in particular, to a wheelbarrow having a novel steering mechanism.

2. Discussion of the Prior Art

As described in the Bisaillon U.S. Pat. No. 5,924,708, issued Jul. 20, 1999, in general, conventional wheelbarrows are difficult to steer, particularly when filled with a heavy load. When using a single wheeled vehicle, tipping is a common occurrence when turning. The use of two wheels on a wheelbarrow makes the device move stable, but does not solve the turning problems. The second paragraph of the above-referenced Bisaillon US patent lists several references disclosing steering mechanisms for small carts and the like. The apparatus described by the Bisaillon patent provides a solution to the problem. However, in terms of structural simplicity the existing apparatus could use improvement, particularly if the steering mechanism is to be retrofitted to an existing vehicle.

The object of the present invention is to provide a wheelbarrow having a relatively simple steering mechanism, which facilitates construction of the wheelbarrow and retrofitting existing vehicles.

Accordingly, the invention relates to a wheelbarrow comprising:

a frame;

a container on the frame for carrying a load;

a pair of axles proximate a front end of the frame rotatable around vertical axes relative to the frame;

a pair of spaced apart handles extending rearwardly from and pivotally connected to the rear of the frame for independent rotation around a horizontal axis;

first levers extending downwardly from said handles;

second levers on said axles for rotating the axles around said vertical axes;

a pair of first linkages connecting said first and second levers; and a second linkage interconnecting said pair of axles, whereby rotation of said handles in opposite directions around said horizontal axis results in rotation of both said axles around said vertical axes.

BRIEF DESCRIPTION OF THE DRAWINGS

The invention is described below in greater detail with reference to the drawings, wherein:

FIG. 1 is a side view of a wheelbarrow incorporating a preferred embodiment of the steering mechanism of the present invention;

FIG. 2 is a front view of the wheelbarrow and steering mechanism of FIG. 1;

Figure 3:
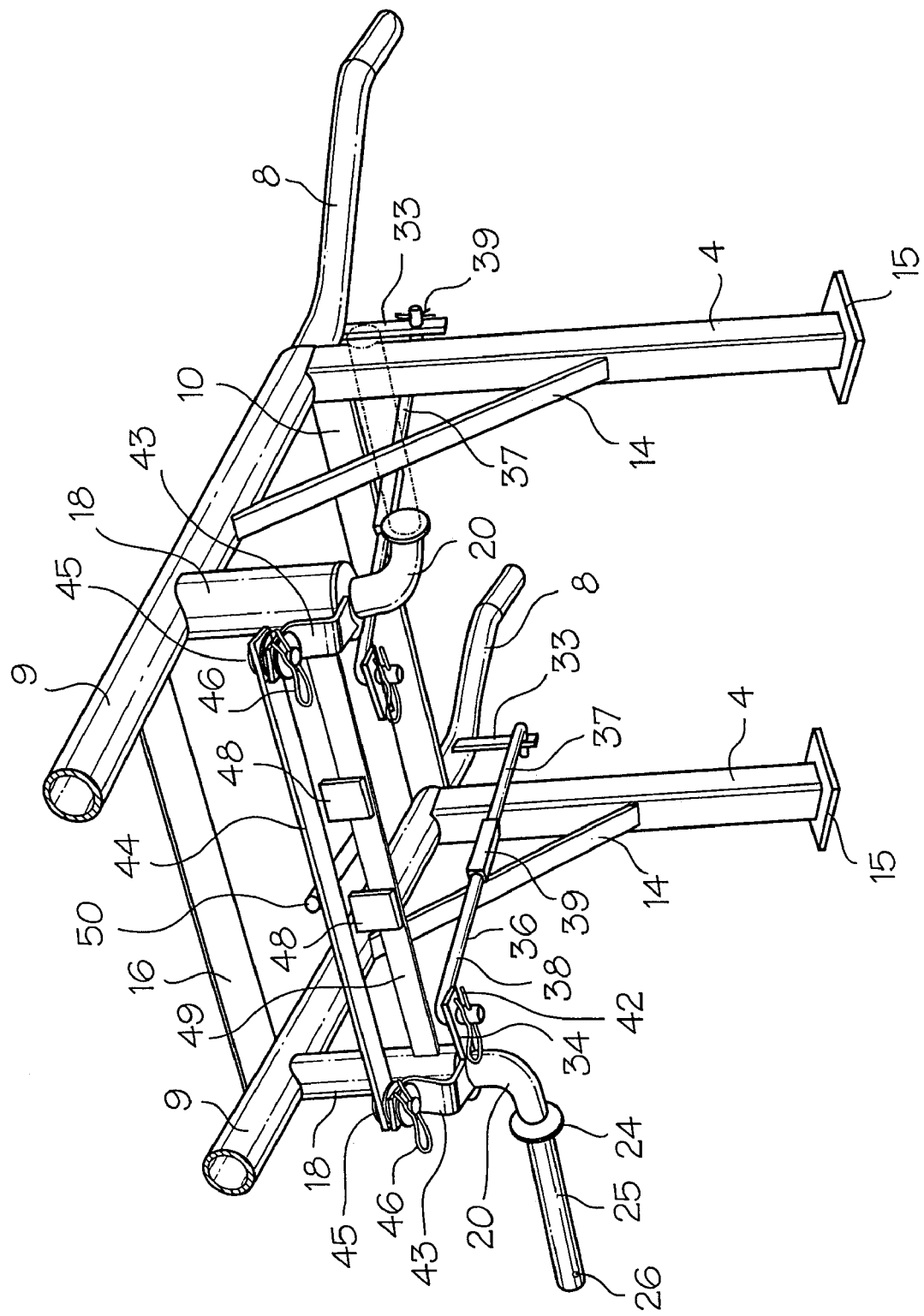
FIG. 3 is a perspective view of all but the front end of a frame used in the wheelbarrow of FIGS. 1 and 2 as seen from below.

With reference to the drawings, the wheelbarrow of the present invention includes a frame indicated generally at 1 supported by a pair of wheels 2 proximate the front end 3 and legs 4 at the rear end 5. A conventional container 7 is mounted on the frame 1 for carrying a load. A pair of handles 8 extend rearwardly from the frame 1 for lifting the rear end 5 of the frame. In the case of the present invention, the handles 8 are also used to steer the wheelbarrow.

As best shown in FIGS. 2 and 3, the frame 1 is defined by a pair of parallel, tubular sides 9 interconnected at their rear ends by a flat plate 10. The front ends 11 of the sides 9 slope downwardly and are interconnected by a crossbar 12, which is integral with the sides. The crossbar 12 acts as a fulcrum when the wheelbarrow is tilted around the axis of the wheels 2 during a dumping operation. The legs 4 extend downwardly and slightly rearwardly from the rear ends of the sides 9. Diagonal braces 14 extend between the sides 9 and the legs 4. Flat plates defining feet 15 are provided on the bottom ends of the legs 4. The frame 1 is reinforced by a crossbar 16 near the inclined front ends 11 of the sides 9. The crossbar 16 also supports the container 7.

Figure 4:
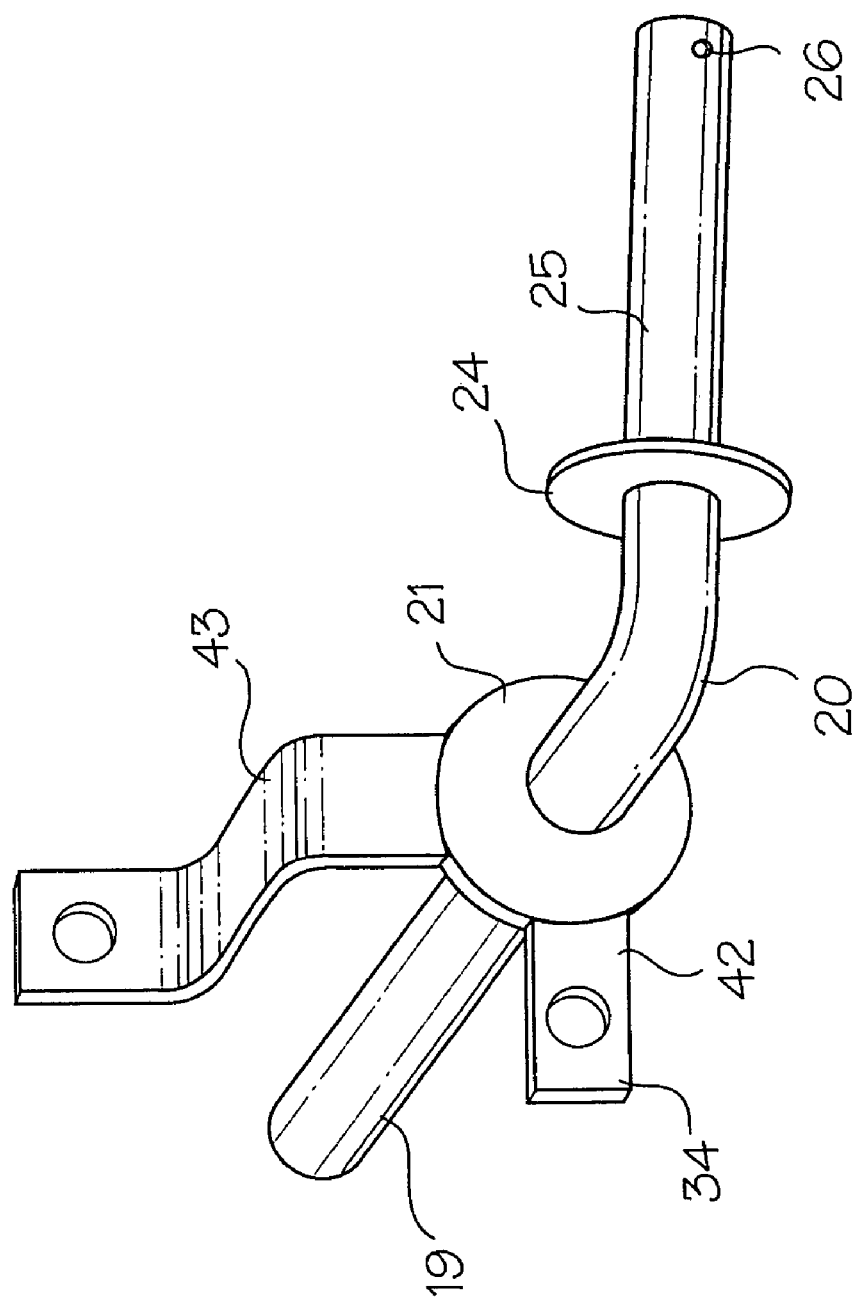
FIG. 4 is an isometric view of an axle assembly used in the steering mechanism as viewed from below.

A sleeve 18 extends downwardly from each of the sides 9 near the location of the crossbar 16 for rotatably receiving the vertical arm 19 of a generally L-shaped axle assembly 20 (FIG. 4). An annular flange 21 on the vertical arm 19 of the axle assembly 20 limits movement of the axle assembly 20 into the sleeve 18. A second flange 24 on the horizontal arm or axle 25 of the assembly 20 limits movement of a wheel 2 onto the axle, i.e. positions the wheel on the axle. A hole 26 is provided in the outer end of the axle 25 of each assembly 20 for receiving a cotter pin (not shown) which retains a wheel 2 on the axle.

Figure 5:
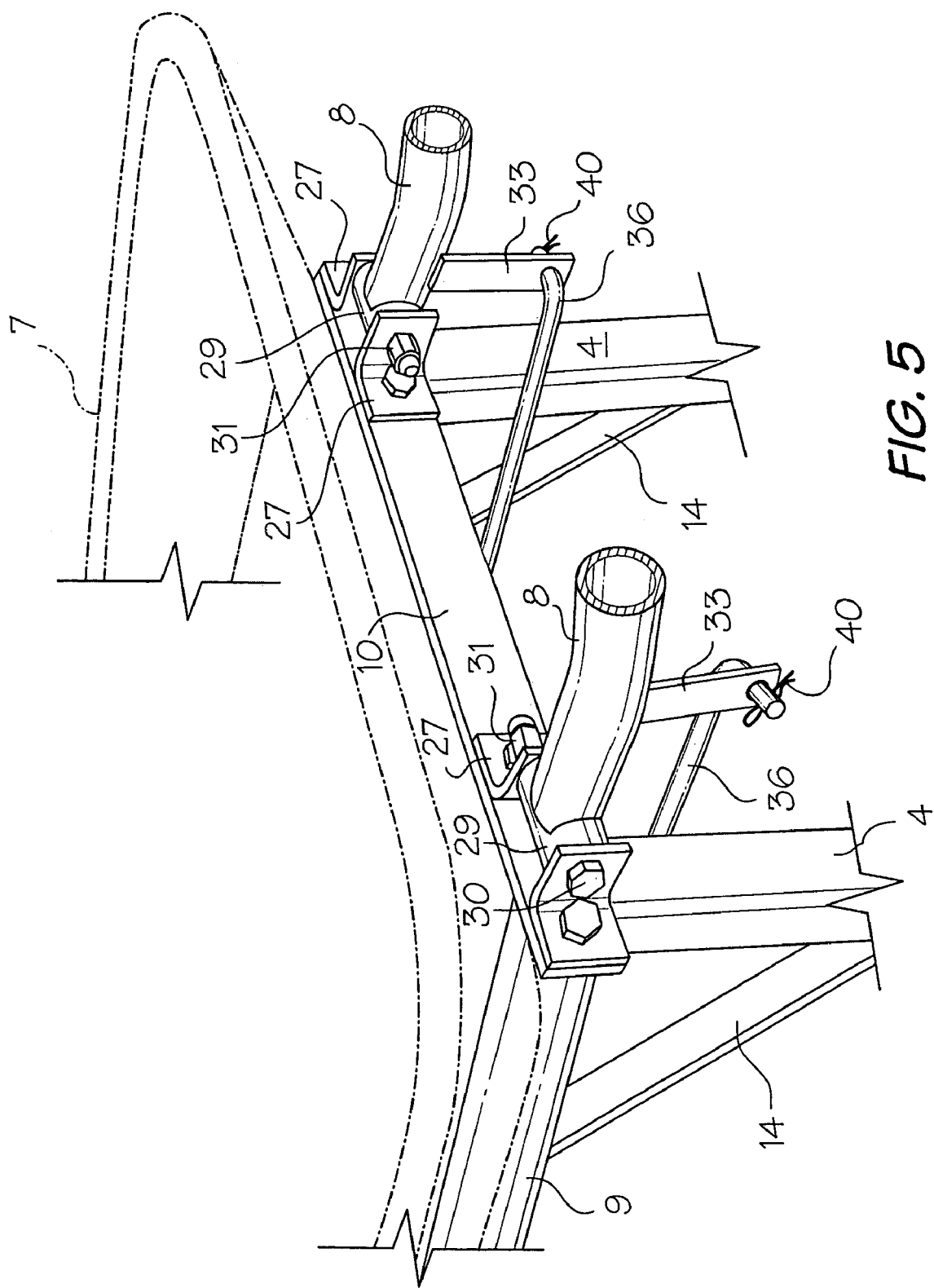
FIG. 5 is an isometric view of the rear end of the frame of the wheelbarrow of FIGS. 1 and 2.
Figure 6:
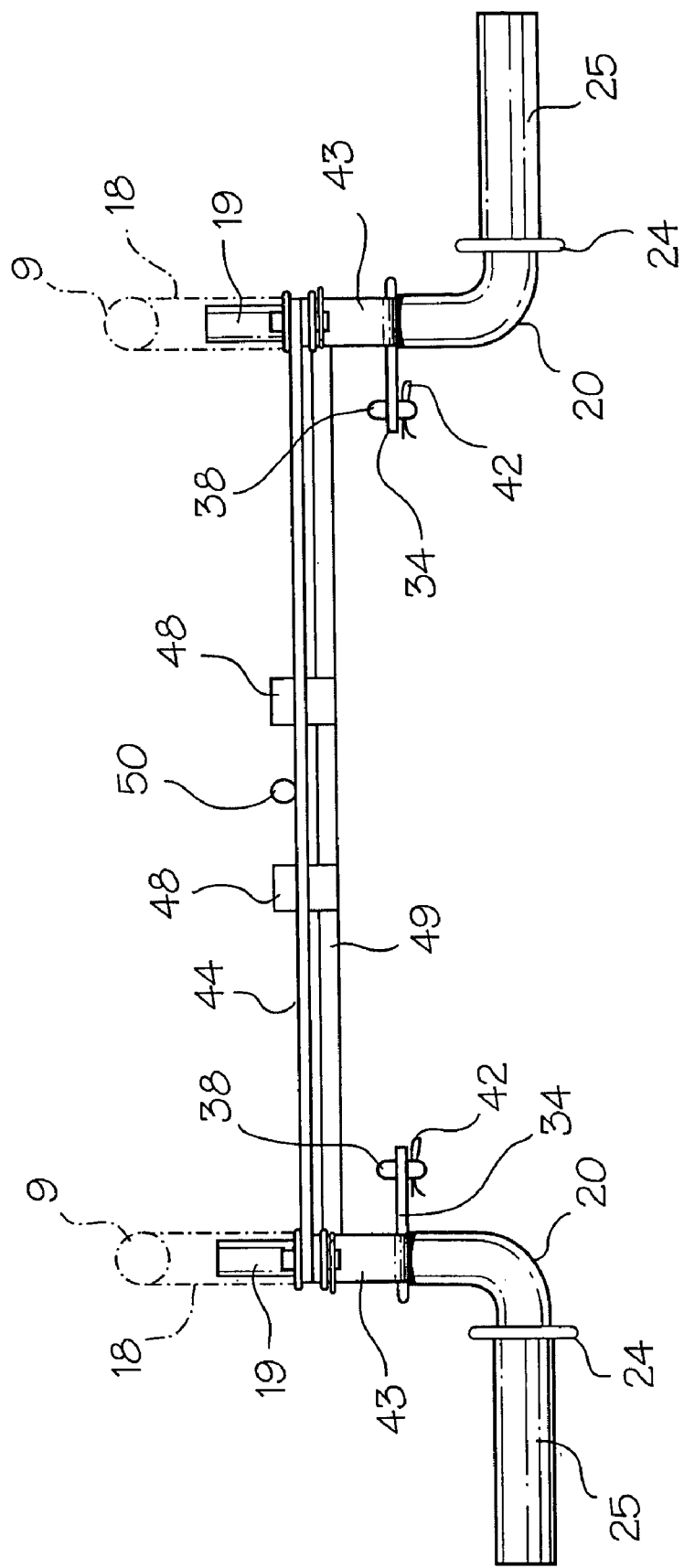
FIG. 6 is a rear view of the steering mechanism of FIGS. 1 and 2.

The wheelbarrow is steered using a steering mechanism, which includes the handles 8. As best shown in FIG. 5, the handles 8 are pivotally mounted on the plate 10 defining the rear end of the frame 1. For such purpose a pair of spaced apart clevis-like brackets 27 are mounted on the plate 10 at the ends thereof. A transversely extending sleeve 29 on the front end of each handle 8 containing a bushing (not shown) is rotatably retained in the bracket 27 by a bolt 30 and a nut 32. A lever 33 extending downwardly from the front end of each handle 8 is connected to a second lever 34 welded to the vertical arm of an axle assembly 20 near the corner thereof by a linkage 36. Each linkage 36 is defined by a pair of rods 37 and 38 connected end-to-end by an internally threaded coupler 39, which permits adjustments to the length of the linkage. The L-shaped end of one rod 36 is connected to the lever 33 by a cotter pin 40. The L-shaped end of the other rod 38 is connected to the lever 34 by a cotter pin 42.

Another, generally S-shaped lever 43, which is perpendicular to the lever 34, extends forwardly and upwardly from each axle assembly 20, i.e. towards the front end of the wheelbarrow. The levers 34 are interconnected by a second linkage 44 defined by a cross arm pivotally connected to the levers 43 by straight pins 45 and cotter pins 46. With this arrangement, rotation of the one axle assembly 20 around the longitudinal axis of the sleeve 18 results in a simultaneous corresponding rotation of the other axle assembly to cause turning of the wheels 2 in unison. The amount by which the wheels 2 can be turned is limited by stops in the form of a pair of spaced apart posts 48 mounted on a crossbar 49 extending between the bottom ends of the sleeves 18, and a pin 50 extending rearwardly from the center of the cross arm 44 between the posts 48. When the arm 44 moves sufficiently laterally with respect to the wheelbarrow frame 1, the pin 50 encounters one of the stop posts 48. The spacing between the posts 48 dictates the minimum turning radius of the wheelbarrow. The stop assembly reduces the likelihood of tipping during turning of the wheelbarrow.

In operation, with the handles 8 at the same level, the wheelbarrow will travel along a straight line. By lifting on one handle 8 and/or pushing down on the other handle 8, the arrangement of the levers 33, 34 and 43, and the linkages 36 and 44 cause the wheels 2 to rotate in unison around parallel horizontal axes so that the wheelbarrow turns smoothly. The use of levers and linkages directly connecting each handle 8 to one axle 25 makes turning of the wheelbarrow relatively easy. The stop posts 48 on the crossbar 49 and the pin 50 on the linkage 44 reduce the amount by which the wheels 2 can be turned to reduce the likelihood of tipping.

The invention claimed is:

1. A wheelbarrow comprising:
   a frame;
   a container on the frame for carrying a load;
   a pair of axles proximate a front end of the frame rotatable around vertical axes relative to the frame;
   a pair of spaced apart handles extending rearwardly from and pivotally connected to the rear of the frame for independent rotation around a horizontal axis;
   first levers extending downwardly from said handles;
   second levers on said axles for rotating the axles around said vertical axes;
   a pair of first linkages connecting said first and second levers; and
   a second linkage interconnecting said pair of axles, whereby rotation of said handles in opposite directions around said horizontal axis results in rotation of both said axles around said vertical axes.

2. The wheelbarrow of claim 1, including a stop assembly for limiting rotation of said axles during turning of the wheelbarrow.

3. The wheelbarrow of claim 2, wherein said stop assembly includes a pin extending forwardly from said second linkage beneath said frame, a crossbar suspended from said frame, and a pair of spaced apart posts on said crossbar for engagement by said pin when the wheelbarrow is turned by a predetermined limit in either of two directions.

4. The wheelbarrow of claim 1, wherein said first linkage includes first and second rods connected to one said first lever and to one said second lever, coupler for connecting said rods end-to-end, whereby the length of said first linkage and the orientation of free ends of the rods can be adjusted.

5. The wheelbarrow of claim 1, including a pair of spaced apart sleeves extending downwardly from said frame for rotatably receiving said axles for rotation around said vertical axes.

6. The wheelbarrow of claim 5, wherein each said axle is L-shaped, including a vertical arm rotatable in one said sleeve, and a horizontal arm for supporting a wheel.

7. The wheelbarrow of claim 5, wherein said second linkage includes third levers on said axles perpendicular to said second levers, and a cross arm extending between and rotatably connected to said third levers.

* * * * *